Aug. 11, 1953  O. SCHMUZIGER  2,648,247
ELASTIC SLEEVE
Filed April 25, 1950
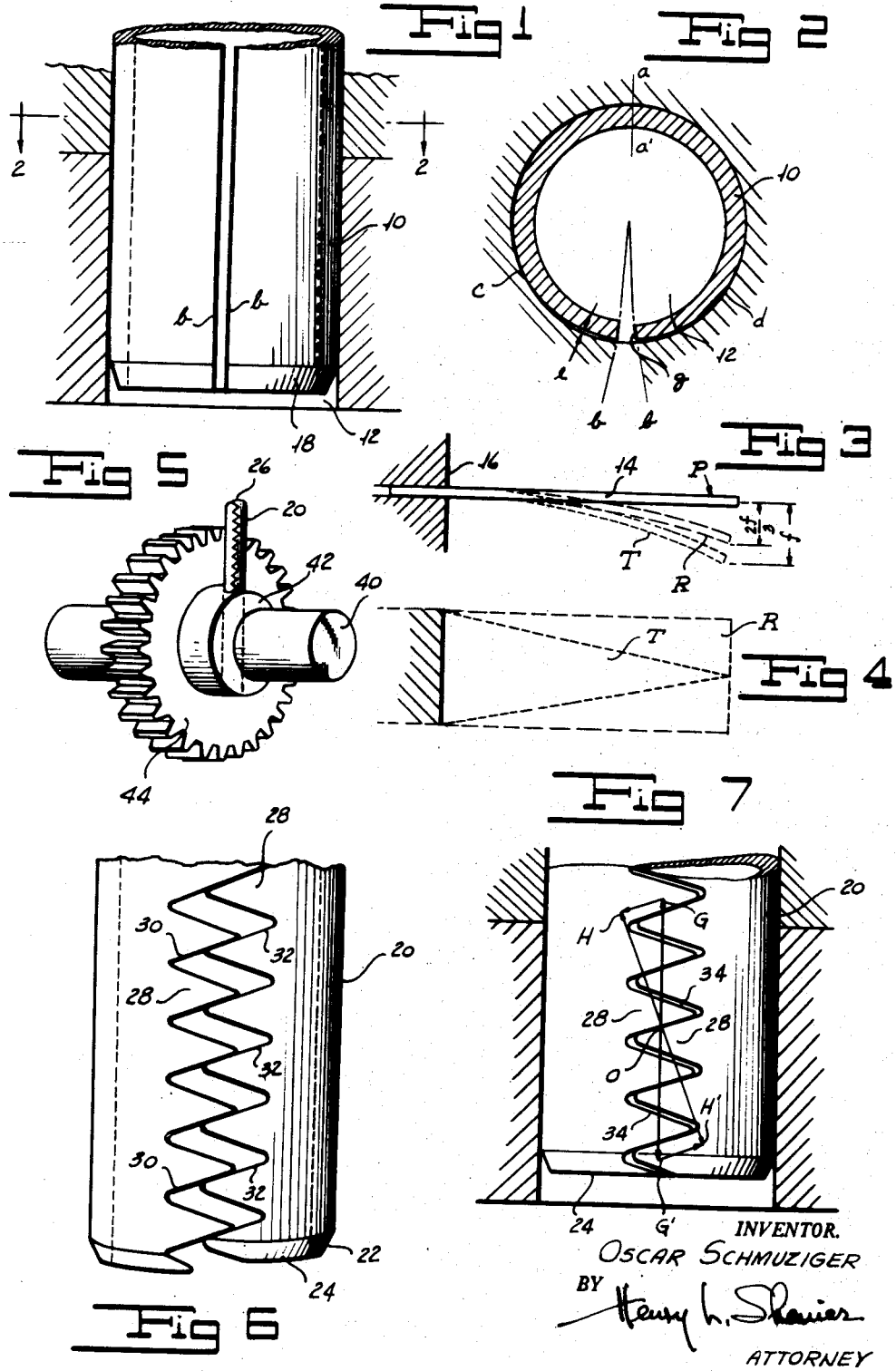
INVENTOR.
OSCAR SCHMUZIGER
BY
ATTORNEY Patented Aug. 11, 1953

2,648,247

UNITED STATES PATENT OFFICE 2,648,247

ELASTIC SLEEVE

Oscar Schmuziger, Ruschlikon, Switzerland

Application April 25, 1950, Serial No. 158,043
In Switzerland November 23, 1949

5 Claims. (Cl. 85—8.3)

My invention relates to elastic sleeves, and more particularly to a slotted sleeve of great elasticity for use as a stress held element acting as a securing pin, a rotating or bearing shaft, or the like.

Axially slotted elastic sleeves are known to the art. They are usually made of alloy steel having inherent elasticity when heat-treated. The sleeves may also be made of other elastic material, such as beryllium copper or plastic material, provided it has sufficient elasticity. The slotted sleeves of the prior art, when dissassembled, must have an outside diameter considerably larger than the diameter of the hole in which they are to be lodged in order to exercise sufficient pressure to resist axial dislocation. For example, a hole having a diameter of .315 of an inch will require a slotted sleeve of the known type of an outside diameter of .335 of an inch. When assembled, the sleeve of the example will decrease its outside diameter by .02 of an inch. This deformation induces stresses exceeding the elastic limit, giving the sleeve a permanent set so that when it is removed from the hole it will no longer spring to its original diameter of .335 of an inch but to a diameter varying between .323 of an inch and .326 of an inch. This permanent set is such that the re-use of the sleeve is unsatisfactory. Furthermore, when it is removed and relocated a number of times it becomes completely useless. Then, too, the sleeves of the prior art do not conform to the contour of the hole perfectly, especially adjacent the area of the slot. The outer edges of the slots will make only line contact with the hole so that when the sleeve is driven into the hole the hole will become deformed or scored. If the wall thickness of the sleeve is reduced, the sleeve will conform to the hole contour more closely, but in this case the axial holding power is reduced. Where the sleeves are used to resist shear, the slot must occupy a definite position with respect to the shear forces, and where line contact exists, increased difficulties are encountered with the sleeves of the prior art.

One object of my invention is to provide an elastic sleeve having increased elasticity.

Another object of my invention is to provide an elastic sleeve in which the sleeve will not be stressed beyond its elastic limit in use.

Another object of my invention is to provide an elastic sleeve which may be used and re-used without damage to the sleeve or to the hole in which it is to be lodged.

Another object of my invention is to provide an elastic sleeve which will more closely conform to the contour of the hole and which, due to increased elasticity of the construction of my invention, will have increased holding power against axial dislocation.

Other objects of my invention will appear from the following description.

In the accompanying drawings which form part of the instant specification and which are to be read in conjunction therewith and in which like reference numerals are used to indicate like parts in the various views:

Figure 1 is an elevation of a portion of a sleeve of the prior art.

Figure 2 is a sectional view taken along the line 2—2 of Figure 1.

Figure 3 is a diagrammatic view of a leaf spring supported adjacent one end, showing the deflections obtained by a variation in the shape of the spring.

Figure 4 is a plan view showing the shapes of the two leaf springs of Figure 3.

Figure 5 is a perspective view showing an elastic sleeve of my invention about to be driven to secure a gear to a shaft.

Figure 6 is an elevation of a sleeve containing one embodiment of my invention before it is lodged in a hole.

Figure 7 is an elevation showing the sleeve of Figure 6 in position in a hole.

Referring now to Figures 1 and 2, in which a slotted steel sleeve of the prior art is shown, it will be observed that the edges $b$ of the sleeve 10 contact the internal surface of the hole 12 with line contact. The sleeve may be considered as a pair of curved leaf springs secured along the line $a$—$a'$ of Figure 2. For a distance around the hole to say a point $c$ the external surface of the sleeve and the internal surface of the hole conform to each other. Between the distance $c$ and $b$ there is a gap $e$ in which the free end of the sleeve segment does not contact the internal wall of the hole 12. If the edge of the sleeve is cut away as at $g$ the sleeve will contact the hole through a greater arc, say to a point indicated by the reference letter $d$. The reduction of the wall thickness, however, reduces the pressure exercised against the wall by the sleeve and hence lessens the holding power of the sleeve.

Let us now consider Figures 3 and 4, in which a leaf spring 14 is supported by a member 16. If a force P is applied at the end of the spring 14 it will deflect downwardly, as shown by the dotted line position T and the dash line position R. The spring will deflect along the locus of a circle since the elastic curve for both springs is generally circular. If the cross-sectional shape of the spring is rectangular, as indicated by R in Figure 4, the curve tends to become a straight line adjacent its end. If the cross section of the spring, however, is made triangular as shown by T in Figure 4, the deflection for the same force will be greater. I have found that the relationship is such that the deflection of a spring of triangular cross-sectional shape is one-third larger than the deflection of a spring with a rectangular cross-sectional shape. If the deflection at the end of the triangular shaped spring 14 be $f$, then the deflection for a spring of the same length of rectangular cross-sectional shape will be $2f/3$ with the same force applied. Along with the increase in deflection comes an increase in resiliency and the extreme end of the spring will continue to lie along the locus of a circle.

The first feature of my invention, therefore, is the dentation of the edges of the slot of the elastic sleeve forming a plurality of substantially individual springs of triangular cross-sectional shape. The length of the teeth is determined by the wall thickness of the sleeve 10 and is such that instead of forming a gap from the point $c$ to the point $b$ in Figure 2 the slot ends will conform with the internal curvature of the hole in which they are lodged. Furthermore, due to the greater resilience of the triangular shaped spring the deflection caused by seating the sleeve will not introduce a permanent set into the material of the sleeve, that is, it is not stressed beyond its elastic limit, so that when the sleeve is removed it will spring back to its original position and hence may be re-used repeatedly.

The lower end 18 of the old sleeve was tapered to facilitate its introduction into the hole 12. In the sleeve 20 of my invention the lower end 22 is likewise tapered for the same reason. The lower edge 24 and the upper edge 26 of my sleeve, however, lie along the locus of a helix. The free edges of the sleeve are formed with a plurality of interfitting triangular teeth 28. Each of the teeth 28 will be radially deflected by the hole surface when the sleeve is driven home. In addition, each of the lower flank surfaces 30 of the left-hand teeth will ride along the upper flank surfaces 32 of the right-hand teeth camming the right-hand portion of the sleeve downwardly and the left-hand portion of the sleeve upwardly to bring the lower edge 24 and the upper edge 26 of the sleeve 20 into a plane as shown in Figure 7. This introduces a tortional stress tending to cam the slot sides apart, seating the sleeve more firmly in the hole without stressing any of the portions of the sleeve beyond the elastic limit of the material. Referring to Figure 7, the axial force acting upwardly on the left-hand tooth 28 is represented by the vector OG. The component normal to the tooth flank is indicated by the vector OH and the component forcing the left edge to the left is represented by the vector GH. Similarly, the axial thrust downwardly is indicated by the vector OG' and the component normal to the tooth flank is indicated by the vector OH' and the component forcing the right-hand edge to the right is indicated by the vector G'H'. These vectors are additive to the natural resilience of the sleeve proper plus the more forcible resilience of the teeth acting radially so that the combined forces will seat the sleeve firmly in the hole with considerable frictional holding power. Furthermore, since the sleeve will conform to the contour of the hole closely this friction is augmented. Then, too, since line contact is avoided all danger of scoring the walls of the hole is avoided. Since none of the portions of the sleeve is stressed beyond its elastic limit the sleeve is not given a permanent set in use and may be re-used without loss of holding power. The maximum stress will occur along a line corresponding to the line $a-a'$ at a point diametrically opposite the axis of the free edges of the sleeve. When the sleeve is first driven into a hole the sleeve will be slightly conical. It will be noted that when the sleeve is in position as shown in Figure 7 there is a slight clearance indicated by the reference numeral 34 between the upper flank of the left teeth and the lower flank of the right teeth. In assuming the conical shape the lower teeth may bottom for a short space. As soon as the driving has progressed a distance, however, the sleeve reassumes the cylindrical form and no damage is occasioned by the bottoming of the lowermost teeth. The slope of the flank angles may vary between wide limits. They should exceed a slope which will overcome the 10% friction between engaging teeth since a slope less than this will lose the vector effect of the longitudinal stress. The slope should not be too great since this will cause difficulty in driving the sleeve. The teeth need not be symmetrical and may, if desired, be formed along the locus of helices. The contacting surface of the teeth should be formed with precision since it is desired that the torque be borne by all of the teeth. The longitudinal axis of the teeth need not follow a straight line but may be given any desired form.

Any elastic material may be employed for the sleeve. Preferably I use a manganese steel, which may be annealed and rolled into strips and then formed with teeth by means of automatic machinery, as is well known to the art. The toothed sheets then may be formed into sleeves, hardened and tempered or otherwise heat-treated to give the sleeves the desired elastic properties both radially and longitudinally. The sleeves may be made in any suitable lengths, for example, a sleeve adapted to be used in a one-quarter inch bore may vary in length from three-eighths of an inch to four inches; a sleeve adapted to be used in a one-half inch bore may vary in length from slightly over three-eighths of an inch to six inches; a sleeve adapted to be used in a three-quarter inch bore may vary from slightly over one-half inch to eight inches in length. In use, as shown in Fig. 5, a bore in the shaft 40 is aligned with a bore in the hub 42 of a gear 44. A sleeve 20 of appropriate size and length is then driven into the bore by means of a hammer until it is seated. It will be found that the sleeve will be firmly secured and will not shake or jar loose due to the holding power imparted by the radial and longitudinal stresses described above. Furthermore, the exterior surface of the sleeve will conform closely to the cylindrical contour of the internal surface of the hole. None of the parts of the sleeve will be stressed beyond the elastic limit, avoiding the danger of breaking and avoiding the loss of holding power because of the permanent set which might be thus introduced. As soon as the sleeve passes from the hub 42 into the bore of the shaft 40 the alignment is fixed and the sleeve may be driven home without further attention to the alignment.

When it is desired to remove the sleeve, a punch having the diameter of the bore may be used to drive the sleeve clear of the hole, and it will be found that the sleeve will resume its original shape and can be re-used as many times as desired without undue wear on either the sleeve or the hole.

It will be obvious to those skilled in the art that my sleeve has many uses. It may form a shaft for an oscillating or rotating member. It may be employed in place of a fitted pin provided with a key or other securing means.

It will be seen that I have accomplished the objects of my invention. I have provided an elastic sleeve having increased elasticity and in which the sleeve will not be stressed beyond its elastic limit in use. This enables my elastic sleeve to be used and re-used without damage either to the sleeve or to the bore in which it is lodged in use. I have provided an elastic sleeve which will conform more closely to the contour of the bore with which it is employed and which, due to the increased elasticity of my construction, will have increased holding power against axial dislocation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A sleeve comprising a sheet of elastic material curved along a generally cylindrical shape with the free edges of the sheet separated from each other and formed substantially entirely with a plurality of longitudinally spaced complementary, coacting, interfitting teeth, each of the teeth being substantially triangular in shape, one free edge of the sheet being axially displaced from the other free edge of the sheet to bring the lower flanks of the teeth of one sheet edge into contact with the adjacent respective upper flanks of the teeth of the other sheet edge.

2. A sleeve as in claim 1 in which the lower outer edge of said sleeve is beveled.

3. An elastic sleeve as in claim 1 in which said teeth have their coacting flanks formed along the locus of a helix.

4. An elastic sleeve including in combination a generally cylindrical body member formed of elastic material and with a slot extending longitudinally of the body member from end to end, the upper and lower edges of said sleeve lying along the locus of a helix, the edges of the slot being formed with interfitting teeth of triangular cross-sectional shape, the flanks of the teeth being formed along the locus of a helix, the upper flank of each tooth on one side of the slot being adapted to contact a portion of the lower flank of each tooth on the other side of the slot, the opposite flanks of the contacting teeth being separated from each other.

5. An elastic sleeve including in combination a generally cylindrical body member formed of elastic material and with a slot extending longitudinally of the body member from end to end, the upper and lower edges of said sleeve lying along the locus of a helix, the edges of the slot being formed with interfitting teeth of triangular cross-sectional shape, the flanks of the teeth being formed along the locus of a helix, the lower portion of the exterior of said sleeve being tapered, the upper flank of each tooth on one side of the slot being adapted to contact a portion of the lower flank of each respective tooth on the other side of the slot, the opposite flanks of the contacting teeth being separated from each other.

OSCAR SCHMUZIGER.

References Cited in the file of this patent

UNITED STATES PATENTS

| Number | Name | Date |
| --- | --- | --- |
| 905,414 | Ette | Dec. 1, 1908 |
| 1,466,137 | Mead | Aug. 28, 1923 |
| 2,236,926 | Surface | Apr. 1, 1941 |

FOREIGN PATENTS

| Number | Country | Date |
| --- | --- | --- |
| 330,676 | Germany | Dec. 20, 1920 |
| 371,473 | Italy | May 25, 1939 |
| 543,797 | Great Britain | Mar. 12, 1942 |